INVENTOR
ASIE C. ROSE JR.

BY Frank C. Leach jr.
ATTORNEY

United States Patent Office 3,326,464
Patented June 20, 1967

3,326,464
METHOD AND APPARATUS FOR CONTROLLING THE HUMIDITY WITHIN AN ENCLOSURE
Asie C. Rose, Jr., 309 Hillsboro Ave., Lexington, Ky. 40505
Filed June 1, 1965, Ser. No. 460,376
15 Claims. (Cl. 236—44)

ABSTRACT OF THE DISCLOSURE

An apparatus for controlling the humidity of heated air within the rooms of a dwelling including means to heat the air. The heating means has both its inlet and its outlet connected with the rooms of the dwelling. A humidifier has its inlet connected between the outlet of the heating means and the rooms of the dwelling. The outlet of the humidifier is connected to a control chamber, which has a second inlet receiving fresh air. The outlet of the control chamber is connected between the inlet of the heating means and the rooms of the dwelling. When the humidity of the heated air within the rooms of the dwelling is less than a selected value, control means within the control chamber are moved to a position to permit air to flow through the humidifier to add moisture thereto. When the humidity of the air within the rooms of the dwelling is greater than the selected value, the control means within the control chamber blocks the flow of air through the humidifier and permits only the flow of fresh air into the control chamber.

---

This invention relates to a method and apparatus for controlling humidity and, more particularly, to a method and apparatus for controlling the humidity of heated air within a dwelling.

During the heating season in climates requiring heat to maintain a dwelling at a comfortable temperature, the humidity within the dwelling creates problems because the humidity within a dwelling varies substantially throughout a twenty-four-hour period. Since cold outside air contains much less moisture even at a high humidity in comparison with warm air at a low humidity, the warming of cold outside air after it enters a dwelling results in a low humidity within the dwelling because of the small quantity of moisture in the entering air. However, because the temperature of the air has been increased, its humidity has decreased. With the entering outside air having such a low moisture content (it has a low humidity after being heated), it draws moisture from the walls, the woodwork, the furniture, and even the occupants of the dwelling.

This low humidity can create health problems for the occupants. These include skin, nose, throat, and bronchial troubles due to moisture being removed from the portions of the human body because of the excessive dryness within the dwelling due to the low humidity therein.

While the admission of cold outside air results in low humidity within the dwelling, there are other factors in the dwelling that cause a high humidity at various times during a twenty-four hour day. These result from various activities within the dwelling including boiling of water, washing and drying of clothes and dishes, cooking, bathing, and washing floors, for example. Furthermore, moisture can even rise from the ground beneath the dwelling to increase the humidity therein; this is particularly applicable to dwellings built on a crawl space or a slab.

During a twenty-four hour day in the heating season, the humidity level within a dwelling may increase sharply at breakfast time because of the use of water in the bath and the kitchen. It may rise even higher as clothes washing and drying follow. During the middle of the day, the humidity level within the dwelling will drop if there are no uses of quantities of water. During preparation of dinner, the humidity will rise again. If baths are taken during the evening hours, this may cause the humidity level to rise even higher or to maintain substantially the same high level as during preparation of dinner. During sleeping hours, little or no water is used so that the humidity within the dwelling falls to low levels. Accordingly, during a twenty-four hour period, the humidity level within a dwelling varies substantially between low and high levels.

These various changes in the moisture of the heated air within the dwelling create undesirable damage to various products within the dwelling. As the moisture within the air increases, it causes wood and many of the painted portions to swell. As the moisture in the air within the dwelling decreases, these same products contract. This microscopic movement causes nails to loosen, paint to peel, and glue in furniture to yield, for example. Additionally, this change in humidity of the heated air can be harmful to the health of the occupants.

The present invention satisfactorily solves the foregoing problems by maintaining the humidity of the heated air within the dwelling at a selected value. When the humidity falls, the present invention adds moisture to the air within the dwelling by diverting a portion from the dwelling through a humidifier or the like. When the humidity increases beyond the selected value, the present invention automatically adds cold outside air, which has low moisture content, in sufficient volume to the dwelling to reduce the humidity. The present invention accomplishes this by maintaining the humidity substantially at the selected value irrespective of changes in the moisture content of the heated air within the dwelling.

Accordingly, a primary object of this invention is to maintain the humidity in a heated enclosure at a selected value.

Another object of this invention is to automatically control the humidity in a dwelling during the heating season.

Other objects of this invention will be readily perceived from the following description, claims, and drawings.

This invention relates to a method of maintaining the humidity of the air of a heated enclosure at a selected value including measuring the humidity of the air within the enclosure and diverting a portion of the air within the enclosure therefrom only when the humidity of the air within the enclosure is less than the selected value. Moisture is added to the diverted air, which is returned to the enclosure after the moisture has been added. Fresh air is introduced into the enclosure when the humidity of the air within the enclosure is greater than the selected value.

This invention also relates to an apparatus for controlling the humidity of heated air within an enclosure including means for heating the air within the enclosure, means to measure the humidity of the heated air, means to add moisture to the heated air, and means to control the flow of air from the enclosure through the moisture adding means. The control means is responsive to the measuring means to allow flow of air through the moisture adding means only when the humidity of the heated air within the enclosure is less than the selected value. The enclosure is connected with the atmosphere by suitable means, which also are controlled by the control means, to permit fresh air to enter the enclosure. The control means is responsive to the measuring means to allow fresh air to flow through the connecting means into the enclosure when the humidity of the heated air within the enclosure is greater than the selected value.

The attached drawings illustrate a preferred embodiment of the invention, in which.

Figure 1:
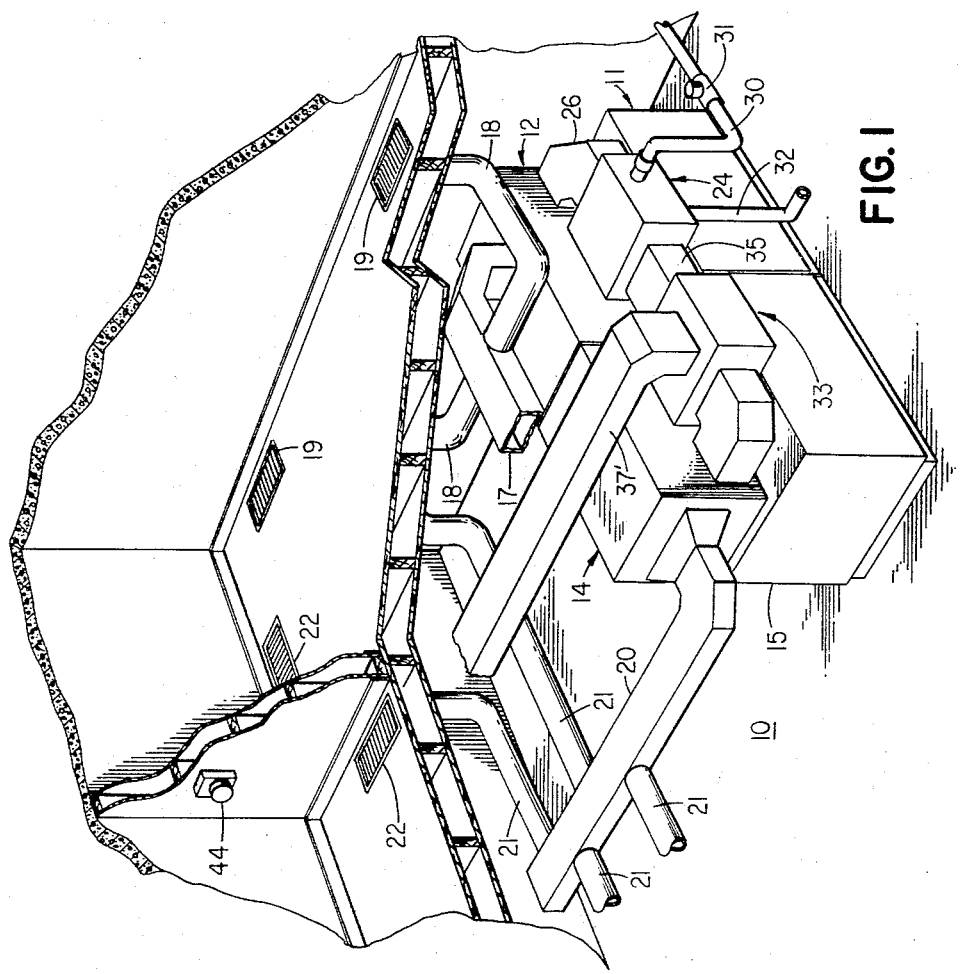
FIGURE 1 is a perspective view of a portion of a dwelling having a furnace incorporating the humidity control apparatus of the present invention.
Figure 2:
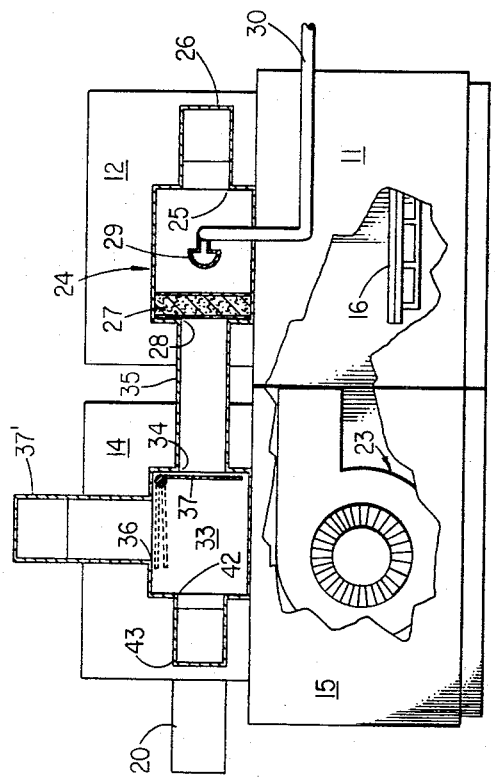
FIGURE 2 is a sectional view, partly in elevation, of the furnace of FIGURE 1 including details of the humidity control apparatus of the present invention.

Referring to the drawings and particularly FIGURES 1 and 2, there is shown a furnace disposed on a basement floor 10 of an enclosure such as a dwelling. The furnace includes a heating chamber 11, a supply chamber 12, a return chamber 14, and a blower chamber 15.

The heating chamber 11 has burners 16, which may be either gas or oil supplied, supported therein. The heating chamber 11 communicates with the supply chamber 12 through an opening. The supply chamber 12 is connected to each of the rooms of the dwelling through a main supply duct 17 having branch supply ducts 18 extending therefrom. Each of the branch ducts 18 communicates with one of the rooms through a register 19. It should be understood that a room may have more than one of the registers 19 therein depending on the size of the room.

The return chamber 14 also communicates with each of the rooms of the dwelling. A main return duct 20 has branch return ducts 21 connected thereto and extending into each of the rooms of the dwelling. Each of the return branch ducts 21 communicates with one of the rooms through a register 22. It should be understood that a room may have more than one of the registers 22 therein depending on the size of the room.

The return chamber 14 communicates with the blower chamber 15, which has a blower 23 mounted therein and driven by suitable means (not shown) such as an electric motor, through an opening. The blower 23 has its inlet communicating with the blower chamber 15 while its outlet is connected to the heating chamber 11.

Thus, the blower 23 provides suction to remove the air from the rooms of the dwelling through the registers 22. The outlet pressure of the blower 23 directs this air over the burners 16 within the heating chamber 11 from which it flows through the supply chamber 12 to the various rooms. The operation of the burners 16 and the blower 23 of the furnace are controlled in the well-known manner by a thermostat (not shown), located in one of the rooms in the dwelling, to regulate the temperature of the heated air in the dwelling.

The humidity control apparatus of the present invention includes a moisture adding device such as a humidifier 24, which has its inlet 25 connected by a duct 26 to the supply chamber 12. The humidifier 24 has a filter 27 mounted therein adjacent its outlet 28.

A water spray nozzle 29 is disposed within the humidifier 24 between the inlet 25 and the filter 27 (see FIGURE 2). Water is supplied under pressure from a suitable source (not shown) to the spray nozzle 29 by a pipe 30. The pipe 30 has a solenoid valve 31 therein to control the flow of water from the source to the spray nozzle 29.

When the solenoid valve 31 is not energized, it closes the pipe 30 to prevent the supply of water to the spray nozzle 29. When the solenoid valve 31 is energized, it allows water to be supplied through the spray nozzle 29 to the interior of the humidifier 24.

A drain pipe 32 removes water from the humidifier 24 in the well-known manner. The drain pipe 32 may either return the water to the source or direct it to a sewer.

The humidity control apparatus includes a control chamber 33. The control chamber 33 has a first inlet 34, which is connected to the outlet 28 of the humidifier 24 by a duct 35, and a second inlet 36, which has a duct 37' connected thereto. The duct 37' extends to the atmosphere outside of the dwelling to allow fresh air to flow into the control chamber 33 through the inlet 36.

Figure 3:
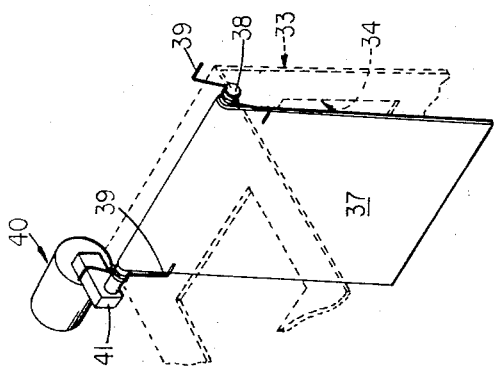
FIGURE 3 is a perspective view of a portion of the humidity control apparatus of the present invention.

A damper 37, which is pivotally mounted by a rod 38 (see FIGURE 3) extending between opposite walls of the control chamber 33, controls the flow of air through the inlets 34 and 36 of the control chamber 33. The damper 37 is biased to its solid line position of FIGURE 2 by resilient means such as springs 39.

An electric motor 40 is connected to the rod 38 through a gear reducer 41. When the motor 40 is energized, it overcomes the force of the springs 39 and moves the damper 37 to open the first inlet 34 and partially or completely block the second inlet 36 of the control chamber 33. The partial blocking position is the dotted line position of the damper closest to the solid line position of FIGURE 2 while the complete blocking position is the dotted line position furtherest from the solid line position of FIGURE 2.

While the springs 39 and the motor 40 have been shown as separate components, it should be understood that the springs 39 could be disposed within the motor 40. One example of such a motor is Minneapolis-Honeywell Model No. M829.

The control chamber 33 has an outlet 42, which is connected by a duct 43 to the return chamber 14. Thus, the air entering the control chamber 33 through the inlets 34 and 36 is directed to the furnace.

A humidistat 44 (see FIGURE 1) is mounted on a wall of one of the rooms of the dwelling to measure the humidity of the air within the dwelling. One example of the humidistat 44 is Minneapolis-Honeywell Model H-44A. The humidistat 44 may be set at any selected value at which it is desired to maintain the humidity within the dwelling during the heating season.

The humidistat 44 is connected by suitable, well-known means to control the energization of the solenoid valve 31 and the electric motor 40. When the humidity falls below the selected value, the humidistat 44 closes an electric circuit to cause energization of the solenoid valve 31 and the motor 40. This allows water to be supplied to the humidifier 24 through the spray nozzle 29; it also results in air being diverted from the supply chamber 12 through the humidifier 24 due to the damper 37 being moved against the force of the springs 39 by the motor 40. Approximately 20% of the air flowing into the supply chamber 12 from the heating chamber 11 is diverted through the humidifier 24 when the damper 37 is in one of its dotted line positions of FIGURE 2.

It should be understood that the damper 37 is movable to only one of the dotted line positions depending on the desired environment. That is, if it is desired to not permit any fresh air to be added to the dwelling when the humidity is below the selected value, the damper 37 completely blocks the inlet 36 of the control chamber 33. However, if it is desired to add some fresh air to the dwelling even when the humidity is below the selected value, the damper is moved to the dotted line position closest to the solid line position of FIGURE 2. In this position, approximately ten percent of the fresh air volume, which enters when the damper 37 is in the solid line position, flows through the inlet 36 into the control chamber 33.

With moisture being added to the diverted air passing through the humidifier 24 by the spray nozzle 29, the humidity of the air within the dwelling is increased to return the humidity to the selected value. When the humidity within the dwelling increases beyond the selected value, the humidistat 44 causes de-energization of the motor 40 and the solenoid valve 31.

De-energization of the solenoid valve 31 automatically stops the supply of water to the spray nozzle 29 in the humidifier 24. When the motor 40 is de-energized, the springs 39 automatically return the damper 37 to the solid line position. This results in only fresh air being supplied through the inlet 36 to the control chamber 33 from which it flows through the duct 43 to the return chamber 14. The blower 23 then directs the mixture of fresh air from the control chamber 33 and the air from the rooms of the dwelling into the heating chamber 11 from which the heated air is supplied through the main supply duct 18 to the rooms of the dwelling.

Considering the operation of the present invention, the humidistat 44 is set at the selected value of humidity at which it is desired to maintain the air within the dwelling. Likewise, the thermostat (not shown) is set at the temperature at which it is desired to maintain the air within the dwelling.

The burners 16 and the blower 23 are regulated by the thermostat in the well-known manner. The humidistat 44 controls the position of the damper 37 and the supply of water to the humidifier 24 through the spray nozzle 29.

When the damper 37 is in the solid line position of FIGURE 2, the humidity within the dwelling is greater than the selected value. As a result, no air is diverted to the humidifier 24 from the supply chamber 12. However, fresh air is supplied to the control chamber 33 through the inlet 36. The fresh air flows from the control chamber 33 through the duct 43 to the return chamber 14 where it is mixed with the air returning from the various rooms of the dwelling. The mixed air is drawn into the blower 23 and directed over the burners 16 in the heating chamber 11 from which it flows to the supply chamber 12. The fresh air is continuously supplied through the inlet 36 of the control chamber 33 until the humidity of the air within the dwelling decreases below the selected value.

When the humidity of the air within the dwelling falls below the selected value, the humidistat 44 senses this decrease in humidity and causes energization of the solenoid valve 31 and the electric motor 40. As a result, water flows through the spray nozzle 29 into the humidifier 24 and the damper 37 is quickly moved from the solid line position to one of the dotted line positions depending on whether any fresh air is to be admitted into the control chamber 33.

With the inlet 34 no longer blocked by the damper 37, a portion (preferably approximately 20%) of the heated air from the supply chamber 12 is diverted to the humidifier 24 where moisture is added to the diverted air by the spray nozzle 29. The moisture added air flows from the control chamber 33 through the duct 43 into the return chamber 14 where it is mixed with the air returning from the rooms of the dwelling through the main return duct 20.

The blower 23 pulls this mixture of air through the blower chamber 15 and discharges it into the heating chamber 11 from which it flows to the supply chamber 12. The inlet 34 remains open until the humidity of the air within the dwelling becomes greater than the selected value.

When the humidity becomes greater than the selected value, the humidistat 44 causes de-energization of the solenoid valve 31 and the damper motor 40. As a result, water supply to the spray nozzle 20 is stopped. Simultaneously, the springs 39 rapidly return the damper 37 to the solid line position of FIGURE 2.

These cycles of adding moisture to divert air or adding cold outside air to the air within the dwelling continue as the humidity of the air within the dwelling varies with respect to the selected value. Each cycle lasts at least 45 minutes so that there is no fluctuation of the damper 37 from one of its positions to the other of its positions, but the damper 37 remains in each of the positions for at least 45 minutes.

Whether the damper 37 is positioned in the dotted line position in which it completely blocks the inlet 36 of the control chamber 33 or only partially blocks the inlet 36 is determined when the humidity control apparatus of the present invention is installed. This is determined by a plurality of factors including the environmental temperature of the area, for example; in very cold climates, the inlet 36 preferably would be completely blocked whereas in more mild climates having heating seasons it preferably would be partially blocked.

While the present invention has been shown and described in conjunction with a warm air furnace having a blower, it should be understood that the invention may be utilized with other types of heating systems such as a hot water heating system, for example. When used with a hot water heating system, it would be necessary to install a blower, preferably in the duct 43, to cause air to be sucked either through the humidifier 24 or through the fresh air duct 37'. In such an arrangement, the duct 26 would connect directly with the dwelling through one or more branch ducts. Similarly, the duct 43 would connect with the dwelling through one or more branch ducts.

An advantage of this invention is that it eliminates variations of humidity within a dwelling during a heating season. Another advantage of this invention is that it prevents damage to the furniture and other wood products within a dwelling during the heating season due to variation of the humidity of the air within the dwelling.

For purposes of exemplification, a particular embodiment of the invention has been shown and described according to the best present understanding thereof. However, it will be apparent that changes and modifications in the arrangement and construction of the parts thereof may be resorted to without departing from the spirit and scope of the invention.

I claim:

1. An apparatus for controlling the humidity of heated air within an enclosure including means for heating the air within the enclosure, means to measure the humidity of the heated air, means to add moisture to the heated air, means to control flow of air from the enclosure through said moisture means, said control means being responsive to said measuring means to allow flow of air through said moisture means only when the humidity of the heated air is less than a selected value, and means connecting the enclosure with the atmosphere to permit fresh air to enter the enclosure, said control means also controlling said connecting means, said control means being responsive to said measuring means to allow fresh air to flow through said connecting means into the enclosure when the humidity of the heated air is greater than the selected value.

2. An apparatus for controlling the humidity of heated air within an enclosure including means to heat the air; means to measure the humidity of the air within the enclosure; a humidifier having an inlet and an outlet; means to direct air from the enclosure to the inlet of said humidifier; a control chamber having an outlet, a first inlet, and a second inlet; means connecting the outlet of said humidifier with said first inlet of said control chamber; means to direct air from said outlet of said control chamber to the enclosure; said control chamber having said second inlet communicating with the atmosphere; means controlling said two inlets of said control chamber in response to said measuring means; said controlling means opening said first inlet of said control chamber only when the humidity of the air within the enclosure is less than a selected value and closing said first inlet of said control chamber when the humidity of the air within the enclosure is greater than the selected value; said controlling means completely opening said second inlet of said control chamber when humidity of the air within the enclosure is greater than the selected value whereby fresh air enters the enclosure; and said controlling means partially closing said second inlet of said control chamber when the humidity of the air within the enclosure is less than the selected value.

3. An apparatus for controlling the humidity of heated air within an enclosure including means to heat the air; means to measure the humidity of the air within the enclosure; a humidifier having an inlet and an outlet; means to direct air from the enclosure to the inlet of said humidifier; a control chamber having an outlet, a first inlet, and a second inlet; means conecting the outlet of said humidifier with said first inlet of said control chamber; means to direct air from said outlet of said control chamber to the enclosure; said control chamber having said second inlet communicating with the atmosphere; means controlling said two inlets of said control chamber in response to said measuring means; said controlling means opening said first inlet of said control chamber only when the humidity of the air within the enclosure is less than a selected value and closing said first inlet of said control chamber when the humidity of the air within the enclosure is greater than the selected value; said controlling means completely opening said second inlet of said control chamber when humidity of the air within the enclosure is greater than the selected value whereby fresh air enters the enclosure; and said controlling means completely closing said second inlet of said control chamber when the humidity of the air within the enclosure is less than the selected value.

4. An apparatus according to claim 2 in which said controlling means is a pivotally mounted damper.

5. An apparatus according to claim 3 in which said controlling means is a pivotally mounted damper.

6. An apparatus for controlling the humidity of heated air within an enclosure including means to heat the air, means to measure the humidity of the air within the enclosure, a humidifier having an inlet and outlet, means to direct air from the enclosure to the inlet of said humidifier, means to direct air from the outlet of said humidifier to the enclosure, said humidifier including means to spray water into the air passing therethrough, a damper, resilient means urging said damper to a first position to close the outlet of said humidifier, motor means connected to said damper to move it to a second position to open the outlet of said humidifier, said measuring means causing actuation of said motor means and said spray means when the humidity of the air within the enclosure is less than a selected value, and fresh air means connecting the atmosphere with the enclosure to allow fresh air to be supplied to the enclosure, said damper partially closing said fresh air means when said motor means is actuated, said damper being returned by said resilient means to said first postion to close the outlet of said humidifier when the humidity of the air within the enclosure is greater than the selected value.

7. An apparatus according to claim 6 in which said damper is pivotaly mounted.

8. An apparatus for controlling the humidity of heated air within an enclosure including means to heat the air, means to measure the humidity of the air within the enclosure, a humidifier having an inlet and an outlet means to direct air from the enclosure to the inlet of said humidifier, means to direct air from the outlet of said humidifier to the enclosure, said humidifier having means to spray water into the air passing therethrough, a damper, resilient means urging said damper to a first position to close the outlet of said humidifier, motor means connected to said damper to move it to a second position to open the outlet of said humidifier, said measuring means causing actuation of said motor means and said spray means when the humidity of the air within the enclosure is less than a selected value, and fresh air means connecting the atmosphere with the enclosure to allow fresh air to be supplied to the enclosure, said damper completely closing said fresh air means when said motor means is actuated, said damper being returned by said resilient means to said first position to close the outlet of said humidifier when the humidity of the air within the enclosure is greater than the selected value.

9. An apparatus according to claim 8 in which said damper is pivotally mounted.

10. An apparatus for controlling the humidity of heated air within an enclosure including a furnace; said furnace having a heating chamber, a supply chamber, a return chamber, and a blower; said blower having its inlet communicating with said return chamber and its outlet communicating with said heating chamber whereby air is circulated from said return chamber through said heating chamber to said supply chamber; said supply chamber communicating with the enclosure; said return chamber communicating with the enclosure whereby said blower pulls the air from said return chamber for heating in said heating chamber and returns it to the enclosure through said supply chamber; a humidifier having an inlet and an outlet; a first duct connecting said supply chamber with the inlet of said humidifier; a control chamber having first and second inlets; a second duct connecting the outlet of said humidifier to said first inlet of said control chamber; said control chamber having its outlet communicating with said return chamber; a third duct connecting said second inlet of said control chamber with the atmosphere; a damper pivotally mounted within said control chamber; resilient means constantly urging said damper to a first position to completely block said first inlet; motor means connected to said damper to move said damper to a second position to open said first inlet; means to measure the humidity of the heated air within the enclosure; said measuring means causing energization of said motor means when the humidity of the heated air within the enclosure is less than a selected value to move said damper to its second position; and said measuring means causing de-energization of said motor means when the humidity of the heated air within the enclosure is greater than the selected value whereby said damper is returned to its first position by said resilient means.

11. An apparatus for controlling the humidity of heated air within an enclosure including a furnace; said furnace having a heating chamber, a supply chamber, a return chamber, and a blower; said blower having its inlet communicating with said return chamber and its outlet communicating with said heating chamber whereby air is circulated from said return chamber through said heating chamber to said supply chamber; said supply chamber communicating with the enclosure; said return chamber communicating with the enclosure whereby said blower pulls the air from said return chamber for heating in said heating chamber and returns it to the enclosure through said supply chamber; a humidifier having an inlet and an outlet; a first duct connecting said supply chamber with the inlet of said humidifier; a control chamber having first and second inlets; a second duct connecting the outlet of said humidifier to said first inlet of said control chamber; said control chamber having its outlet communicating with said return chamber; a third duct connecting said second inlet of said control chamber with the atmosphere; a damper pivotally mounted within said control chamber; resilient means constantly urging said damper to a first position to completely block said first inlet; motor means connected to said damper to move said damper to a second position to open said first inlet; said humidifier having means to add moisture to aid flowing through said humidifier; means to measure the humidity of the heated air within the enclosure; said measuring means causing energization of said motor means when the humidity of the heated air within the enclosure is less than a selected value to move said damper to its second position; said measuring means causing energization of said moisture means in said humidifier when said motor means is energized; and said measuring means causing de-energization of said motor means and said moisture means when the humidity of the heated air within the enclosure is greater than the selected value whereby said damper is returned to its first position by said resilient means.

12. An apparatus for controlling the humidity of heated air within an enclosure including a furnace; said furnace having a heating chamber, a supply chamber, a return chamber, and a blower; said blower having its inlet communicating with said return chamber and its outlet communicating with said heating chamber whereby air is circulated from said return chamber through said heating chamber to said supply chamber; said supply chamber communicating with the enclosure; said return chamber communicating with the enclosure whereby said blower pulls the air from said return chamber for heating in said heating chamber and returns it to the enclosure through said supply chamber; a humidifier having an inlet and an outlet; a first duct connecting said supply chamber with the inlet of said humidifier; a control chamber having first and second inlets; a second duct connecting the outlet of said humidifier to said first inlet of said control chamber; said control chamber having its outlet communicating with said return chamber; a third duct connecting said second inlet of said control chamber with the atmosphere; a damper pivotally mounted within said control chamber; resilient means constantly urging said damper to a first position to completely block said first inlet; motor means connected to said damper to move said damper to a second position to open said first inlet and partially close said second inlet; said humidifier having means to add moisture to air flowing through said humidifier; means to measure the humidity of the heated air within the enclosure; said measuring means causing energization of said motor means when the humidity of the heated air within the enclosure is less than a selected value to move said damper to its second position; said measuring means causing energization of said moisture means in said humidifier when said motor means is energized; and said measuring means causing de-energization of said motor means and said moisture means when the humidity of the heated air within the enclosure is greater than the selected value whereby said damper is returned to its first position by said resilient means.

13. An apparatus for controlling the humidity of heated air within an enclosure including a furnace; said furnace having a heating chamber, a supply chamber, a return chamber, and a blower; said blower having its inlet communicating with said return chamber and its outlet communicating with said heating chamber whereby air is circulated from said return chamber through said heating chamber to said supply chamber; said supply chamber communicating with the enclosure; said return chamber communicating with the enclosure whereby said blower pulls the air from said return chamber for heating in said heating chamber and returns it to the enclosure through said supply chamber; a humidifier having an inlet and an outlet; a first duct connecting said supply chamber with the inlet of said humidifier; a control chamber having first and second inlets; a second duct connecting the outlet of said humidifier to said first inlet of said control chamber; said control chamber having its outlet communicating with said return chamber; a third duct connecting said second inlet of said control chamber with the atmosphere; a damper pivotally mounted within said control chamber; resilient means constantly urging said damper to a first position to completely block said first inlet; motor means connected to said damper to move said damper to a second position to open said first inlet and completely close said second inlet; said humidifier having means to add moisture to air flowing through said humidifier; means to measure the humidity of the heated air within the enclosure; said measuring means causing energization of said motor means when the humidity of the heated air within the enclosure is less than a selected value to move said damper to its second position; said measuring means causing energization of said moisture means in said humidifier when said motor means is energized; and said measuring means causing de-energization of said motor means and said moisture means when the humidity of the heated air within the enclosure is greater than the selected value whereby said damper is returned to its first position by said resilient means.

14. A method of maintaining the humidity of the air of a heated enclosure at a selected value including measuring the humidity of the air within the enclosure, diverting a portion of the air within the enclosure therefrom to add moisture thereto only when the humidity of the air within the enclosure is less than the selected value, adding moisture to the diverted air, returning the diverted air to the enclosure after moisture has been added, introducing a first predetermined amount of fresh air into the enclosure when the humidity of the air within the enclosure is less than the selected value, and introducing a second predetermined amount of fresh air greater than the first predetrmined amount into the enclosure when the humidity of the air within the enclosure is greater than the selected value.

15. An apparatus for controlling the humidity of the heated air within an enclosure including means for heating the air within the enclosure, means to measure the humidity of the heated air, means to add moisture to the means in said control chamber to control flow of air from the enclosure to said moisture means, means to direct air from said moisture means to said control chamber, means to supply fresh air to said control chamber, means to direct air from said control chamber to the enclosure, means in said control chamber to control flow air from said moisture means to said control chamber and from said fresh air supply means to said control chamber, said control means being responsive to said measuring means to allow flow of air through said moisture means only when the humidity of the heated air is less than the selected value, and said control means being responsive to said measuring means to allow fresh air to flow from said fresh air supply means to said control chamber when the humidity of the air is greater than the selected value.

References Cited

UNITED STATES PATENTS

| | | | |
|---|---|---|---|
| 1,540,322 | 6/1925 | Folsom | 236—44 |
| 1,815,385 | 7/1931 | Wigelsworth | 236—44 X |
| 1,933,541 | 11/1933 | Bruce | 236—44 X |
| 2,807,258 | 9/1957 | Pennington | 126—113 |

WILLIAM J. WYE, *Primary Examiner.*

ROBERT A. O'LEARY, *Examiner.*

A. D. STEWART, *Assistant Examiner.*

UNITED STATES PATENT OFFICE
CERTIFICATE OF CORRECTION

Patent No. 3,326,464                      June 20, 1967

Asie C. Rose, Jr.

It is hereby certified that error appears in the above numbered patent requiring correction and that the said Letters Patent should read as corrected below.

Column 4, line 69, for "of" read -- of the --; column 5, line 50, for "20" read -- 29 --; line 53, for "divert" read -- diverted --; column 7, line 20, after "and" insert -- an --; line 40, for "pivotaly" read -- pivotally --; line 44, for "outlet" read -- outlet, --; column 8, line 51, for "aid" read -- air --; column 10, line 29, after "the", second occurrence, insert -- heated air, a control chamber, means to direct --; line 30, strike out "means in said chamber to control flow of"; line 35, after "flow" insert -- of --.

(SEAL)           Signed and sealed this 18th day of June 1968.

Attest:

Edward M. Fletcher, Jr.                     EDWARD J. BRENNER

Attesting Officer                            Commissioner of Patents